United States Patent Office 3,707,581
Patented Dec. 26, 1972

3,707,581
OLEFIN CONVERSION PROCESS USING CATALYST CONTAINING A METAL PHOSPHATE SUPPORT
Louis F. Heckelsberg, Bartlesville, Okla., assignor to Phillips Petroleum Company
No Drawing. Continuation of abandoned application Ser. No. 846,977, Aug. 1, 1969, which is a continuation-in-part of abandoned application Ser. No. 627,632, Apr. 3, 1967. This application Dec. 30, 1970, Ser. No. 102,883
Int. Cl. C07c 3/62, 11/02, 13/02
U.S. Cl. 260—683 D
10 Claims

ABSTRACT OF THE DISCLOSURE

Olefins are converted into other olefins having different numbers of carbon atoms by contact with a catalyst active for disproportionating propylene into ethylene and butene and comprising a phosphate of aluminum, zirconium, calcium, magnesium or titanium and promoted by one or more selected compounds of tungsten, molybdenum, or rhenium.

CROSS REFERENCE TO RELATED APPLICATIONS

This application is a continuation of my copending application Ser. No. 846,977, filed Aug. 1, 1969, which in turn was a continuation-in-part and copending with my application Ser. No. 627,632, filed Apr. 3, 1967 both of which are now abandoned.

BACKGROUND OF THE INVENTION

This invention relates to the conversion of olefin hydrocarbons and to a catalyst for such conversion. In one aspect this invention relates to the olefin reaction. In another aspect it relates to the conversion of olefins to other olefins having different molecular weight. In still another aspect it relates to a novel catalyst for converting olefins to other olefins having molecular weights different from the starting olefin.

The term olefin reaction as used herein, is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third carbon atoms and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyene; for example, the conversion of ethylene and 4-methylpentene-2 yields 3-methylbutene-1 and propylene;

(4) The conversion of ethylene or an acyclic mono- or polyene having three or more carbon atoms and a cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

It is an object of this invention to provide a method and a catalyst for the conversion of olefin hydrocarbons. It is also an object of this invention to provide a catalyst for the conversion of olefin hydrocarbons. A further object is to provide a catalyst for the olefin reaction. Still another object is to provide a method for converting olefins to other olefins of higher and lower number of carbon atoms. The provision of a catalyst for converting olefins to other olefins of higher and lower number of carbon atoms is yet another object of the invention. Other aspects, objects and advantages of the invention will be apparent to one skilled in the art upon study of the disclosure including the detailed description of the invention.

SUMMARY OF THE INVENTION

According to the process of this invention, olefins are converted to other olefins by contacting the olefins, under appropriate reaction conditions, including conditions of temperature and residence time, with a catalyst, active for disproportionating propylene into ethylene and butene, said catalyst comprising one or more of the group aluminum phosphate, zirconium phosphate, calcium phosphate, magnesium phosphate, or titanium phosphate promoted by one or more of a sulfide or hexacarbonyl of molybdenum or tungsten; or promoted by an oxide of molybdenum, tungsten, or rhenium; or by magnesium tungstate; or by beryllium phosphotungstate.

DETAILED DESCRIPTION OF INVENTION

The zirconium phosphate, aluminum phosphate, calcium phosphate, magnesium phosphate or titanium phosphate can be referred to as the support because such component will usually be present as the major component of the composite catalyst. These components are usually less expensive and are more readily produced in large quantities than are the other components of the composite catalyst. It should be understood, however, that the catalytic agent which has activity for the olefin conversion is the reaction product resulting from the admixture of the metal phosphate and a suitable promoter under activating conditions.

The metal phosphates, which are suitable for the supports in the preparation of the catalysts of the present invention can be any conventional catalytic grade materials prepared by any conventional technique. Particularly suitable phosphates are the chemically precipitated and purified hydrous oxides or hydrogels of the metal normal orthophosphates, since these materials generally possess a relatively high effective surface area. Such metal orthophosphate hydrogels can be prepared by the precipitation of a soluble salt of the metal with phosphoric acid or a phosphate salt. For example, aluminum orthophosphate can be prepared by aqueous alkaline precipitation of soluble sodium aluminate and sodium phosphate salts.

Sufficient promoter is used to obtain the desired activity. Since the promoter materials are usually more expensive than the support materials, unnecessarily large amounts are ordinarily not used. Generally, the finished catalyst base contains from about 0.1 percent to 30 percent by weight of the selected promoter. However, larger amounts can be used. In most instances, a preferred amount of the promoter is from about 1 percent to 20 percent.

The catalyst compositions of this invention can be prepared and activated by conventional techniques. For example, molybdenum oxide can be coprecipitated with aluminum phosphate followed by calcination in air at temperatures of 700 to 1600° F. for 0.5 to 20 hours to produce an activated catalyst. Alternatively, the support material, such as aluminum phosphate, can be impregnated with a compound of the promoter convertible to the oxide, such as ammonium metatungstate, followed by calcination in air as described above. In the preparation of sulfide-containing catalysts, a sulfide of the promoter can be ball milled with a support, such as zirconium phosphate, followed by heating in an inert atmosphere, such as nitrogen, for 0.5 to 20 hours at 800–1400° F. or higher. In the preparation of catalysts from hexacarbonyls, the support material, such as a previously calcined calcium phosphate, can be impregnated with a solution of the hexacarbonyl of the promoter in an organic solvent such as benzene followed by drying at about 50–700° F., in an inert atmosphere or vacuum. Magnesium tungstate and beryllium phosphotungstate can be dry mixed with titanium phosphate, for example, and activated by calcination in air at elevated temperatures.

The preferred catalysts of the present invention are those employing aluminum normal orthophosphate as the support material. Excellent results are obtained with aluminum phosphate-supported tungsten oxide and rhenium oxide.

It should be noted when the support is associated with one or more of the promoters and is given the activation treatment, the finished catalyst may contain species whose identities are not completely understood. It should, therefore, be understood that the catalytic agent can be the reaction product resulting from the admixture under activating conditions, of the support component and the promoter component of the catalyst composition. Furthermore, the term "phosphate," as, for example, aluminum phosphate, is used for convenience. It is realized that the "phosphate" can exist in the present catalytic compositions as a mixture and/or complex of oxides of the metal in question and oxides of phosphorus. Thus, the term "phosphate" as used herein includes material consisting essentially of the metal, phosphorus, and oxygen.

The finished catalysts, prepared from the promoter materials and the support materials of the present invention, can range, in form, from a fine powder to coarse granules as well as in other shapes such as agglomerates, pellets, spheres, extrudates, beads, and the like, depending upon the type of contacting technique which utilizes the catalyst.

The process of this invention can be carried out either batchwise or continuously, using a fixed bed, stirred batch reactor, fluidized catalyst chamber, or other conventional contacting technique. The process can be carried out in vapor or liquid phase at temperatures of about $-50$ to 1200° F. and at pressures of 0 to 2000 p.s.i.g. (pounds per square inch gage). When the promoter is rhenium oxide, the process is preferably carried out at a temperature range of about $-60$ to about 1000° F., more preferably at a temperature range of from about 50 to about 250° F. When the promoter material of the composite catalyst is molybdenum oxide or tungsten oxide, a temperature range of from about 600 to about 1200° F. is preferred, while temperatures in the range of 800 to 1000° F. will often be preferred in order to obtain optimum conversion and efficiency. Although the reaction of this invention is essentially independent of pressure, one will ordinarily employ the pressure suitable for most economical operation. In batch reactions, the catalyst comprises from 1 to about 40 weight percent of the reaction mixture and reaction times of about 1 minute to 20 hours are used.

In continuous operation, the optimum range of contact time for this invention process depends primarily upon the activity of the catalyst which is influenced by surface area, promoter concentration, activation temperature, etc., and upon the operating temperature. In general, undesired side reactions are favored by longer contact times. Therefore, the contact time should be maintained as short as possible, consistent with desired conversion.

In general, for continuous operation, weight hourly space velocities in the range of about 0.5 to 1000 parts by weight of hydrocarbon feed per part by weight of catalyst per hour are suitable, with excellent results being obtained in the range of about 1 to 500. Space rates given in the examples in this disclosure result in weight hourly space rates in the range of 0.5 to 1000.

The reactions of this invention can be carried out in the presence or absence of a diluent. Paraffinic and cycloparaffinic hydrocarbons are suitable diluents. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be nonreactive under the conditions of the reaction.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixture of the above olefins; and mixtures of ethylene and the above olefins. Many useful reactions are accomplished with such acyclic olefins having 3–30 carbon atoms per molecule and with such olefins having 4–5 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5- octadiene, 2,4,6-octatriene, 2-nonene, 1-dodecene, 2-tetradecene, 1-hexadecene, 5,6-dimethyl-2,4-octadiene, 2-methyl - 1-butene, 2-methyl-2-butene, 1,3-dodecadiene, 1,3,6-dodecatriene, 3-methyl-1-butene, 1-phenylbutene-2,7,7-diethyl - 1,3,5-decatriene, 1,3,5,7,9-octadecapentene, 1,3-eicosadiene, 4-octene, 3-eicosene nad 3-heptene, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5 - n-propylcyclooctene, cyclodecene, cyclododecene, 5,5,4,4-tetramethylcyclononene, 3,4,5,6,7-pentaethylcyclodecene, 1,5-cyclooctadiene, 15,9 - cyclodedecatriene, 1,4,7,10-cyclododecatetraene 2-methyl-6-ethyl-cyclooctadiene-1,4-, and the like, and mixtures thereof.

Presently preferred olefinic feed compounds are those contained in the following classes:

(1) Acyclic monoolefins, including those with aryl, cycloalkyl, and cycloalkenyl substituents, having 3–20 carbon atoms per molecule with no branching closer than about the 3-position to the double bond, no quaternary carbon atoms and no aromatic substitution closer than the 4-position to the double bond, and mixtures of such unsubstituted acyclic monoolefins. Some examples of these are propylene, pentene-1, pentene-2, butene-1, butene-2, 3-methylbutene-1, hexene-2, octene-4, nonene-2, 4-methylpentene-1, decene-3, 8-ethyldecene-2, dodecene-4, vinylcyclohexane, 4-vinylcyclohexene, eicosene-1, and the like.

(2) A mixture of ethylene and one or more acyclic unsubstituted internal monoolefins of (1). Some examples of such mixtures are ethylene and butene-2, ethylene and pentene-2, ethylene and hexene-3, ethylene and heptene-3, ethylene and 4-methylpentene-2, ethylene and octene-4, ethylene and dodecene-4, and the like.

(3) Acyclic, nonconjugated polyenes having from 5 to about 20 carbon atoms per molecule, containing from 2 to about 4 double bonds per molecule and having no double bond with branching nearer than the 3-position to that double bond, and having at least one double bond with no quaternary carbon atoms and no aromatic substitution nearer than the 4-position to that double bond, or mixtures of such polyenes. Some examples are 1,4-pentadiene, 1,5-hexadiene, 2,6-decadiene, 1,5,9-dodecatriene, 4-methylheptadiene-1,6, 1,7-octadiene, 1,6-octadiene, and the like.

(4) A mixture of ethylene and one or more acyclic polyenes of (3) which contain at least one internal double bond. Some examples are ethylene and 1,6-octadiene, ethylene and 1,5-decadiene, and the like.

(5) Cyclopentene.

(6) Cyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to that double bond, and mixtures of such olefins including mixtures with cyclopentene. Some examples are cycloheptene, cyclooctene, 4-methylcyclooctene, 3-methyl-5-ethylcyclodecene, cyclononene, cyclododecene, norbornene, and the like.

(7) A mixture of one or more of the monocyclic olefins of (6) with either ethylene or with one or more unsubstituted acyclic monoolefins of (1). Some examples of these are ethylene and cycloheptene, ethylene and cyclooctene, propylene and cyclodecene, pentene-2 and cyclooctene, ethylene and cyclododecene, and the like.

(8) Cyclic and bicyclic nonconjugated polyenes having from 5 to about 12 ring carbon atoms, including those substituted with up to 3 alkyl groups having up to about 5 carbon atoms each, having at least one double bond with no branching closer than the 3-position and with no quaternary carbon atoms closer than the 4-position to that double bond, and mixtures thereof. Some examples of there are 1,5 - cyclooctadiene, 1,5,9 - cyclododecatriene, 1,4-cycloheptadiene, norbornadiene, and the like.

(9) A mixture of one or more monocyclic polyenes of (8) with one or more acyclic 1-olefins having from 2 to about 10 carbon atoms, having no branching nearer than the 3-position and no quaternary carbon atoms nearer than the 4-position to the double bond. Some examples of these are 1,5-cyclooctadiene and ethylene, 1,5,9-cyclodecatriene and ethylene, 1,5,9-cyclododecatriene and pentene-1, and the like.

The following specific embodiments will be helpful in attaining an understanding of the invention but they should be considered as exemplary and should not be construed as unduly limiting the invention.

EXAMPLE I

A catalyst containing about 90 weight percent zironium phosphate and 10 weight percent tungsten oxide was prepared. A 50 g. quantity of zirconium nitrate was dissolved in 2 liters of methanol. A 50 ml. quantity of phosphoric acid was added with stirring. The resulting thick white gel was filtered and washed with 2 liters of methanol, and dried in a steam bath. A 23:18 g. quantity of the dried gel (20–40 mesh) was blended with incremental quantities of a solution of 3.0 g. of ammonium metatungstate in abount 25 ml. of water. The solid was dried on a steam bath between the incremental additions.

A 5 ml. quantity of the above-prepared catalyst composition was charged into a glass reactor tube. A 2 ml. bed of glass beads preceded the catalyst bed within the fixed bed reactor. Utilizing an electrical heater which surrounded the glass reactor tube, the catalyst bed was activated in place by heating for 4 hours at 1000° F. in a stream of dry flowing aid. Following the activation, the system was flushed with nitrogen and cooled.

Propylene was introduced into the reactor at atmospheric pressure and at a space rate of 10 v./v./min. The results of the run, in terms of the effluent analysis by weight obtained by vapor phase chromatography, are seen in the following table:

TABLE I

| | 800° F. | 900° F. |
|---|---|---|
| Analysis, wt. percent: | | |
| Ethylene | 0.5 | 0.6 |
| Propylene | 95.9 | 96.8 |
| 1-butene | 2.3 | 1.3 |
| t-2-butene | 0.7 | 0.5 |
| c-2-butene | 0.6 | 0.8 |
| Conversion, percent | 4.1 | 3.2 |

The data in the table above show that propylene is effectively disproportionated to both ethylene and butenes.

EXAMPLE II

A catalyst containing about 95 weight percent calcium phosphate and about 5 weight percent tungsten oxide was prepared. A 21.87 g. quantity of tribasic calcium phosphate powder was slurried with a solution containing 1.28 g. of ammonium metatungstate and about 100 ml. water. The slurry was dried on a steam bath and the resulting cake was broken up and screened to 20–40 mesh particle size.

Using a reactor identical to that of Example I the catalyst was activated and used to disproportionate propylene in essentially the same manner and under the same conditions as Example I. The results are seen in the following Table II:

TABLE II

| | 800° F. | 900° F. | 1,000° F. |
|---|---|---|---|
| Analysis, wt. percent: | | | |
| Ethylene | 0.6 | 1.0 | 1.1 |
| Propylene | 98.6 | 97.5 | 97.3 |
| 1-butene | 0.3 | 0.5 | 0.5 |
| t-2-butene | 0.3 | 0.6 | 0.6 |
| c-2-butene | 0.2 | 0.4 | 0.5 |
| Conversion, percent | 1.4 | 2.5 | 2.7 |

The data show that propylene was effectively disproportionated to both ethylene and butenes.

EXAMPLE III

A catalyst containing about 95 weight percent magnesium phosphate and about 5 weight percent tungsten oxide was prepared. A 16.26 g. quantity of magnesium phosphate was slurried with a solution containing 1.01 g. of ammonium metatungstate in about 25 ml. water. The slurry was dried in a steam bath, the resulting cake broken up, and a 20–40 fraction retained for further use.

Using the same apparatus of Example I, this catalyst was activated and used to disproportionate propylene under essentially the same conditions used in Example I. The results are seen in the following Table III:

TABLE III

| Analysis of product: | 900° F. |
|---|---|
| Ethylene, wt. percent | 0.9 |
| Propylene, wt. percent | 97.6 |
| 1-butene, wt. percent | 0.5 |
| t-2-butene, wt. percent | 0.6 |
| c-2-butene, wt. percent | 0.4 |
| Others | Trace |
| Conversion, percent | 2.4 |

The data show that propylene was disproportionated to both ethylene and butenes.

EXAMPLE IV

A catalyst containing about 95 weight percent titanium phosphate and about 5 weight-percent tungsten oxide was prepared. An 11.23 g. quantity of titanium phosphate powder was blended with incremental portions of a solution containing 0.69 g. ammonium metatungstate in about 25 ml. water. The slurry was dried over a steam bath in between the incremental additions. A dried quantity of 20–40 mesh catalyst was recovered.

The above-prepared catalyst was activated and used to disproportionate propylene in a manner essentially identical to that in the preceding examples. The results of this test are shown in the following Table IV:

TABLE IV

| Analysis of product: | 900° F. |
|---|---|
| Ethylene, wt. percent | 0.4 |
| Propylene, wt. percent | 98.8 |
| 1-butene, wt. percent | 0.3 |
| t-2-butene, wt. percent | 0.3 |
| c-2-butene, wt. percent | 0.2 |
| Others | Trace |
| Conversion, percent | 1.2 |

The above data indicate that propylene was disproportionated to ethylene and butenes.

EXAMPLE V

A catalyst containing about 95 weight percent aluminum phosphate and 5 weight percent molybdenum oxide was prepared. An 8.72 gram quantity of ammonium molybdate was dissolved in about 50 ml. of deionized water and then slurried with 68.63 grams of powdered crystalline aluminum orthophosphate. The slurry was then dried on a hot plate. The resulting solid was then broken up and a 20–40 mesh fraction was used in a propylene disproportionation run.

Using the same apparatus and the same conditions as in Example I, this catalyst was activated and used to disproportionate propylene. The results are shown in the following Table V:

TABLE V

| Temperature, °F | 800 | 900 | 1,000 |
|---|---|---|---|
| Ethylene | 1.9 | 2.2 | 2.2 |
| Propylene | 95.2 | 94.6 | 94.5 |
| 1-butene | 0.9 | 1.1 | 1.2 |
| Trans-2-butene | 1.0 | 1.2 | 1.2 |
| Cis-2-butene | 0.8 | 0.9 | 0.9 |
| Conversion, percent | 4.8 | 5.4 | 5.5 |

The data in the table above show that propylene was effectively disproportionated to both ethylene and butenes with good conversion.

EXAMPLE VI

A catalyst containing about 92 weight percent aluminum phosphate and 8 weight percent tungsten oxide having a surface area of 135 m.$^2$/g. was prepared by admixing aqueous solutions of aluminum nitrate and dibasic ammonium phosphate and drying the resulting solid. This solid was an aluminum phosphate gel having a surface area of 135 m.$^2$/g. It was then impregnated with ammonium metatungstate as in Example I.

The catalyst was charged to a reactor, activated and utilized in reacting propylene under the conditions shown in the following Table VI. The catalyst was reactivated between Runs 1 and 2 with dry air for 4 hours at 1000° F.

TABLE VI.—CONVERSION OF PROPYLENE

| Run number | 1 | | | | 2 | | |
|---|---|---|---|---|---|---|---|
| Time on stream, min | 45 | 85 | 155 | 205 | 30 | 60 | 90 |
| Pressure, p.s.i.g | 100 | 100 | 100 | 100 | 100 | 100 | 100 |
| Temperature, °F | 800 | 900 | 1,000 | 1,000 | 1,000 | 1,000 | 1,000 |
| Space rate, w./w./hr.[1] | 7.5 | 7.5 | 7.5 | 15 | 15 | 15 | 15 |
| Product analysis, wt. percent: | | | | | | | |
| Ethylene | 1.4 | 5.3 | 9.2 | 7.7 | 6.3 | 7.2 | 7.9 |
| Propylene | 96.2 | 85.6 | 66.3 | 77.5 | 81.1 | 79.4 | 78.1 |
| 1-butene | 0.6 | 2.6 | 5.8 | 3.7 | 3.2 | 3.5 | 3.6 |
| Trans-2-butene | 1.0 | 3.6 | 7.1 | 5.1 | 4.1 | 4.6 | 4.9 |
| Cis-2-butene | 0.8 | 2.8 | 5.6 | 4.1 | 3.1 | 3.5 | 3.8 |
| Pentenes | | | 0.9 | 0.3 | 0.3 | 0.2 | 0.3 |
| Hexenes | | | 5.1 | 0.6 | 1.9 | 1.6 | 1.4 |
| Conversion, percent | 4 | 14 | 34 | 22 | 19 | 21 | 22 |
| Efficiency to ethylene and and butenes, percent | | | 82 | 96 | 88 | 91 | 92 |

[1] Parts by weight of feed per part by weight of catalyst per hour.

The above data show that propylene was effectively and efficiently disproportionated to ethylene and butenes by using aluminum phosphate gel as the support.

EXAMPLE VII

In a manner similar to that of the preceding examples and using the same apparatus, propylene was disproportionated by contact with an aluminum phosphate catalyst which was promoted, by impregnation, with 14 weight percent rhenium heptoxide. The catalyst was activated in flowing dry air for 1 hour at 1100° F. then cooled to 75° F. in flowing nitrogen.

The disproportionation run was carried out at 100° F., at atmospheric pressure, and at a propylene feed rate of 3 WHSV. The results of the run, based on an analysis of the effluent after 2 hours on stream, are shown in the following Table VII. All values are in weight percent.

TABLE VII

| Ethylene | 11 |
|---|---|
| Propylene | 68 |
| 1-butene | 0 |
| trans-2-butene | 15 |
| cis-2-butene | 6 |
| Others | 0 |
| Conversion, percent | 32 |

The data of the table shows that the rhenium-promoted aluminum phosphate is an effective catalyst for the disproportionation of propylene. Moreover, rhenium oxide-promoted aluminum phosphate catalyst is also a highly selective catalyst.

EXAMPLE VIII

In a manner similar to Example VII, propylene was disproportionated using a higher temperature and a higher pressure.

The run was carried out over a similar catalyst, aluminum phosphate (about 145 m.$^2$/g. surface area) promoted with 14 weight percent rhenium heptoxide, and which was activated under similar conditions to Example VII. The propylene feed rate was 5 WHSV, the temperature was 150° F., and the pressure was 300 p.s.i.g. Samples of the reactor effluent, taken at two instances during the run, showed the following results which are set forth below in Table VIII. All values are in weight percent.

TABLE VIII

|  | After 3 hrs. | After 6 hrs. |
|---|---|---|
| Ethylene | 12.2 | 4.8 |
| Propylene | 64.4 | 84.8 |
| 1-butene | 0 | 0 |
| Trans-2-butene | 16.8 | 7.7 |
| Cis-2-butene | 6.6 | 3.1 |
| Others | 0 | 0 |
| Conversion, percent | 36 | 16 |

These data show that the rhenium oxide-promoted aluminum phosphate catalyst is effective for disproportionating propylene at higher temperature and pressure.

That which is claimed is:

1. A process which comprises converting at least one feed olefin hydrocarbon selected from the group consisting of acyclic mono- and polyenes having at least 3 carbon atoms per molecule, including cycloalkyl and aryl derivatives thereof; cyclic mono- and polyenes having at least 4 carbon atoms per molecule, including alkyl and aryl derivatives thereof; mixtures of the above olefins; and mixtures of ethylene and the above olefins in accordance with the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each said new pairs being connected by an olefinic double bond by contacting said feed olefin hydrocarbon with a catalyst comprising aluminum phosphate, zirconium phosphate, calcium phosphate, magnesium phosphate, or titanium phosphate, combined with a sulfide or hexacarbonyl of molybdenum or tungsten, with an oxide of molybdenum, tungsten, or rhenium, or with magnesium tungstate or beryllium phosphotungstate, under conditions suitable to produce an olefin reaction product.

2. The process of claim 1 wherein the catalyst is aluminum phosphate impregnated with an oxide of molybdenum, tungsten, or rhenium.

3. The process of claim 1 wherein the catalyst is aluminum phosphate impregnated with tungsten oxide or rhenium oxide.

4. The process of claim 1 wherein the temperature is in the range of about −15 to 1200° F. and the pressure is in the range of 0 to about 2000 p.s.i.g.

5. The process of claim 4 wherein the process is carried out in a batch operation and the olefin feed is in contact with the catalyst for a time in the range of about 1 minute to 20 hours.

6. The process of claim 4 wherein the process is carried out in continuous operation and the weight hourly space velocity is in the range of about 0.5 to 1000 parts by weight of feed per part by weight of catalyst per hour.

7. The process of claim 4 wherein the catalyst comprises aluminum phosphate, calcium phosphate, magnesium phosphate, or titanium phosphate combined with an oxide of molybdenum or tungsten, and the reaction temperature is in the range of from about 600 to about 1200° F.

8. The process of claim 4 wherein the catalyst is aluminum phosphate, calcium phosphate, magnesium phosphate or titanium phosphate combined with rhenium oxide and the reaction temperature is in the range of from about 50 to about 250° F.

9. The process of claim 1 wherein the sulfide or hexacarbonyl of molybdenum or tungsten, the oxide of molybdenum, tungsten, or rhenium, or the magnesium tungstate or beryllium phosphotungstate is present in the catalyst in the range of from about 0.1 to about 30 percent by weight.

10. The process of claim 1 wherein the feed olefin is propylene.

References Cited

UNITED STATES PATENTS

| 2,241,792 | 5/1941 | Reppe et al. | 252—437 |
| 2,831,037 | 4/1958 | Schmerling | 260—666 |
| 2,870,171 | 1/1959 | Gable | 252—437 |
| 3,261,879 | 7/1966 | Banks | 260—683 |
| 3,280,167 | 10/1966 | Schwarzer et al. | 252—437 |
| 3,320,331 | 5/1967 | Gaspar et al. | 252—437 |
| 3,364,264 | 1/1968 | Hardman et al. | 252—437 |
| 3,365,513 | 1/1968 | Heckelsberg | 260—683 |
| 3,457,320 | 7/1969 | Stapp et al. | 260—683 |

DELBERT E. GANTZ, Primary Examiner

C. E. SPRESSER, Jr., Assistant Examiner

U.S. Cl. X.R.

260—666 A, 668 R, 677 R, 680 R